United States Patent [19]

Janzen et al.

[11] 4,283,183
[45] Aug. 11, 1981

[54] CHAIN WHEEL SYSTEM

[75] Inventors: Wolfgang Janzen, Wilnsdorf; Ludger Frenker-Hackfort, Herkersdorf, both of Fed. Rep. of Germany

[73] Assignee: Amsted-Siemag Kette GmbH, Betzdorf-Sieg, Fed. Rep. of Germany

[21] Appl. No.: 33,383

[22] Filed: Apr. 25, 1979

[30] Foreign Application Priority Data

May 10, 1978 [DE] Fed. Rep. of Germany ....... 2820284

[51] Int. Cl.³ .............................................. F16H 55/12
[52] U.S. Cl. ................................................... 474/162
[58] Field of Search .............. 74/243 R, 243 DR, 244, 74/245 R; 52/105; 474/162

[56] References Cited

U.S. PATENT DOCUMENTS

| 1,638,140 | 8/1927 | Best | 74/243 R X |
| 2,764,900 | 10/1956 | Warsmith | 74/243 D R X |
| 3,311,220 | 3/1967 | I'Anson | 74/243 R X |
| 3,381,354 | 5/1968 | Krempa et al. | 74/243 R X |
| 3,657,854 | 4/1972 | Tipton | 52/105 X |
| 3,802,287 | 4/1974 | Graham | 74/243 R X |
| 3,964,219 | 6/1976 | Hala | 52/105 |

FOREIGN PATENT DOCUMENTS

| 1273915 | 7/1968 | Fed. Rep. of Germany | 74/243 R |
| 38686 | 6/1931 | France | 74/243 R |
| 185155 | 9/1963 | Sweden | 74/243 R |

Primary Examiner—C. J. Husar
Assistant Examiner—Moshe I. Cohen
Attorney, Agent, or Firm—Toren, McGeady and Stanger

[57] ABSTRACT

In a chain wheel system tooth blocks are mounted on the circumferential periphery of the drum and are driven by a mating chain. The length of the tooth blocks equals at least the spacing between two links in the mating chain. The tooth blocks are attached to spacers fitted to the circumferential periphery of the drum. Various segment pieces or spacer members can be attached to the drum separating adjacent tooth blocks.

14 Claims, 5 Drawing Figures

CHAIN WHEEL SYSTEM

The invention relates to a chain wheel system with tooth blocks which are fastened on the periphery of a drum with a spacing which corresponds to at least one spacing of a mating chain.

In a known chain wheel system of this type, the tooth blocks required for a certain drum or wheel diameter are connected by means of side bars or chain links in such a manner that an endless tooth block ring is created which can be placed around the drum or the wheel. In the region of the fastening flanges of each tooth block, adjusting screws are arranged which are radially adjustable relative to the drum and by means of which the distance of the tooth blocks from the drum periphery can be adjusted in such a manner that the tooth block system is tensioned and the spacing of the individual tooth crests of each tooth block relative to each other corresponds exactly to one spacing or an integral multiple of the spacing of a mating chain. The tooth blocks are either welded or screwed to the periphery of the drum by means of radial flanges or flange segments. This construction does make it possible to compensate for a certain faulty concentric running of the drum and to take different drum diameters into consideration; however, the alignment work of the individual tooth blocks is very time consuming and requires specific experience in the adjustment of such components. In addition, either angle constructions or flat irons must be fastened to the drum periphery in order to be able to introduce the torque from the tooth segment into the drum.

Starting from the above, the invention is based on the task to provide a chain wheel system which is so simple that even less trained personnel are able to mount the system on a drum or a wheel. In addition, the individual tooth blocks should be replaceable and should consist of a high-strength material whose weldability does not have to be taken into consideration.

In accordance with the invention, this task is solved by tooth blocks which can be screwed onto the periphery of the drum, the lengths of the tooth blocks corresponding to at least one spacing of the drive chain or to an integral multiple thereof.

The tooth block according to the invention can be drop-forged and its dimensions are such that, when two tooth blocks of equal structural size abut each other, the chain wheel system according to the invention is created which is engaged by the drive chain. Preferably, the spacing between the individual tooth blocks corresponds to two spacings of the drive chain. Each tooth block is capable of transmitting 100% of the total power of the chain drive and can be easily replaced in the case of wear or failure. In addition, when selecting the material it is not necessary to take the weldability of the material into consideration.

The transmission of the tangential force from the tooth block to the drum can be effected through spacers which are fitted into two grooves which are arranged parallel to the tooth crest on the bottom side of each tooth block, the height of each spacer being at least equal to the depth of the groove. These spacers may be welded or screwed onto the periphery of the drum. The spacers have the purpose to compensate for the difference in diameter between the drum and the diameter required for an integral number of tooth blocks; for this purpose, they are constructed in sets with equal heights among each other, the height corresponding to the diameter difference measured in each case. Since the diameter difference between the drum and the diameter required for an integral number of tooth blocks is at most equal to the spacing divided by $\pi$ the spacers may be provided with an enlarged space which may be beveled, so that the bending stress in the tooth block is reduced in the case of large diameter differences.

Since each tooth block is capable of transmitting 100% of the total power of the chain drive, it is not required that the tooth crest spacing corresponds to one or two spacings of the chain when the looping angle of the chain is sufficient. Accordingly, on the periphery of the drum only that number of teeth must be arranged which is required for a problem-free force transmission, so that the tooth blocks may assume a a larger spacing than the one corresponding to the lengths of their screw-on flanges. However, to support the drive chain in the regions between the tooth crests, between two tooth blocks segment pieces may be fastened, the length of each segment piece corresponding to at least one tooth spacing and its height being adjusted to a drum diameter which is required for an integral number of tooth blocks. However, spacers with a small length may also serve to support the drive chain, the spacers being fastened on the drum between two tooth blocks with a spacing which corresponds to one chain spacing and the height of each spacer being adjusted to a drum diameter which is required for an integral number of tooth blocks.

When the diameter difference between the drum and the diameter for supporting the drive chain is larger than the height of the segment pieces, there may be arranged transversely extending grooves on the bottom side of each segment piece, the spacers fastened on the drum periphery being fitted into these grooves and the height of each spacer being at least equal to the depth of the groove. These spacers are also made available always in sets in order to compensate for the diameter difference between the drum and the diameter which is required for an integral number of tooth blocks. The spacings between these grooves are equal to the spacings of the grooves in the tooth blocks. The spacers may also be constructed of similar shapes. The segment pieces and/or spacers can be screwed or welded to the drum and, therefore, they can be mounted in the same manner as the tooth blocks.

In order to partially remove the circumferential force to be transmitted from the spacers of the tooth blocks, the segment pieces can be utilized for the force transmission when they are brought into contact at their end faces with the tooth blocks in a direction opposite the direction of rotation of the drum.

To be able to mount the tooth blocks with the required spacings, in the center of each tooth crest there is arranged a bore of limited tolerance. These bores are intended for the engagement of a gauge which can be adjusted to the required length of the chord between two tooth blocks. The adjusting gauge can be adjusted for several spacings by means of a vernier. Another way to facilitate the assembly of the tooth blocks, spacers and support segments is to mark each center of these parts. By measuring the circumference of the drum and a division into the required distances, the tooth blocks, spacers and support segments can be mounted in an exact manner. By doing so, a faulty concentricity of the drum caused by the production is also taken into consideration. The markings in the centers of the tooth blocks, spacers and support segments are arranged in such a manner that they coincide with the divisions of the drum circumference and the spacers and/or support segments are welded on.

In the following, the invention shall be described in more detail with the aid of embodiments which are illustrated in the drawing. In the drawing.

Figure 1:
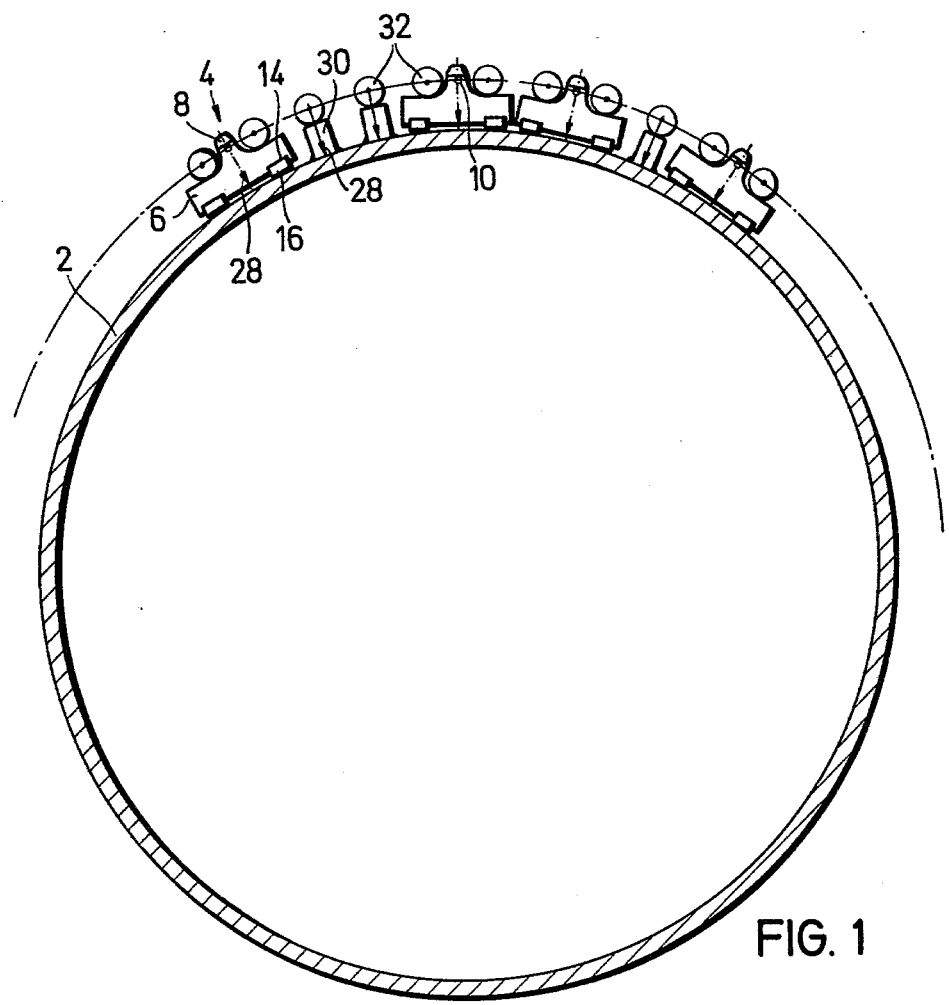
FIG. 1 shows a schematic side view of the chain wheel system.
Figure 2:
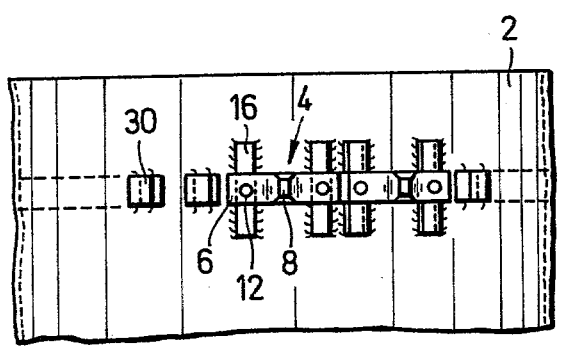
FIG. 2 shows a schematic top view in accordance with FIG. 1.
Figure 3:
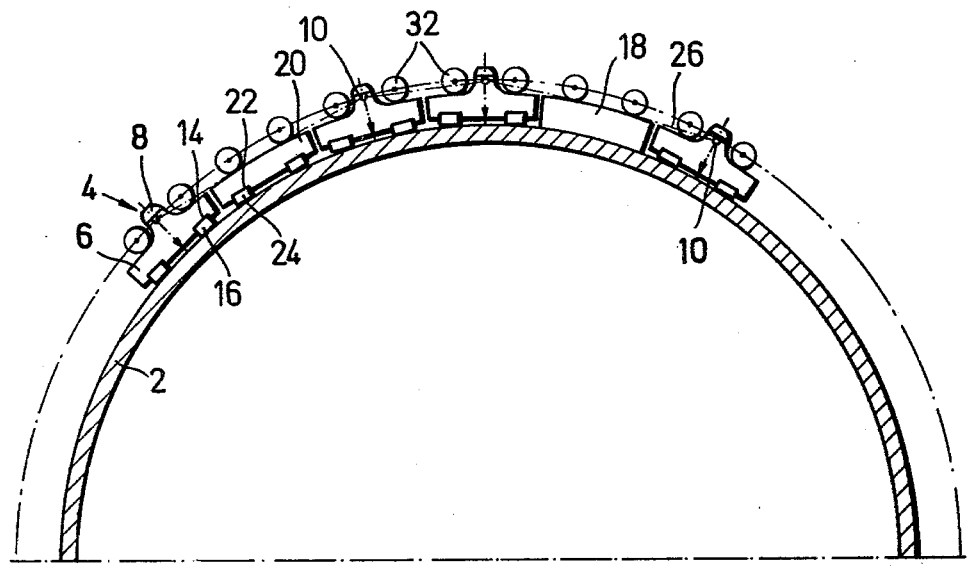
FIG. 3 shows a schematic side view of another chain wheel system.
Figure 4:
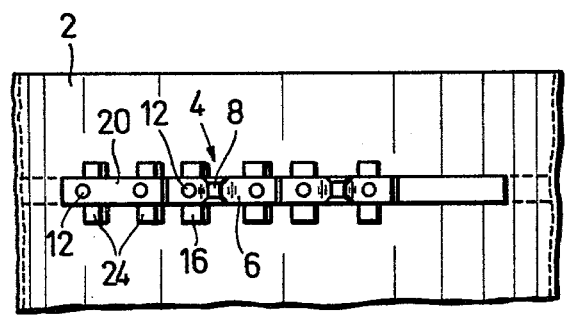
FIG. 4 shows a schematic top view in accordance with FIG. 3.
Figure 5:
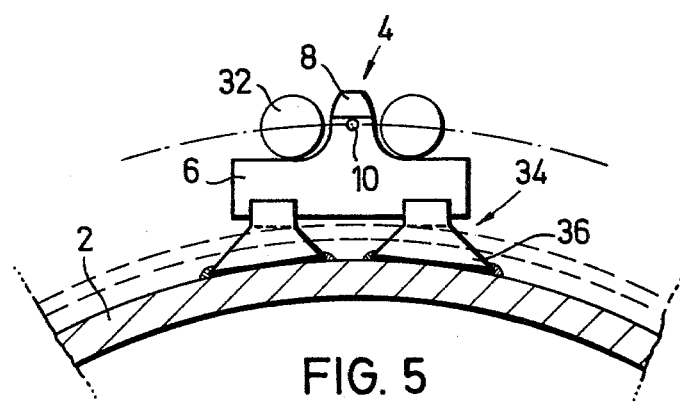
FIG. 5 shows a schematic side view of a tooth block and of two spacers supporting this tooth block.

A number of tooth blocks 4 which correspond to the number of required teeth is fastened on the periphery of a drum 2. Each tooth block 4 has a tooth crest 8 and screw-on flanges 6 arranged at the tooth base. In the present case, the length of the screw-on flange 6 corresponds to the spacing between two links of a drive chain which is in engagement with the tooth crests 8, the drive chain being indicated by rollers 32. Depending on whether the diameter of the drum 2 is of exactly such a size that an integral number of tooth blocks 4 can be fastened directly next to each other on the drum or whether the diameter of the drum 2 deviates therefrom, spacers 16 or 24 are arranged between the periphery of the drum 2 and the tooth blocks 4. These spacers 16 or 24 are fitted into grooves 14 of the screw-on flanges 6, the grooves 14 extending parallel relative to the tooth crest 8. Through fastening screws 12, the spacers may be screwed to the drum 2 or they may be welded on in such a manner that the fastening screws 12 serve only to fasten the tooth blocks 4.

Exactly in the center of each tooth crest 8, a bore 10 of limited tolerance is arranged in which an adjusting gauge, not shown, engages during the assembly. The adjusting gauge can be adjusted through a vernier for several spacings in accordance with a table for chord lengths, so that the tooth blocks 4 can be easily aligned through the chord 26 with the prescribed spacing accuracy. Another assembly possibility resides in providing the tooth blocks 4 and segment pieces 18,20 and spacers 30 which shall be explained in more detail hereinbelow with markings 28 in their centers. By measuring the circumference of the drum 2 and a division into the required spacings, the tooth blocks 4, the segment pieces 18,20 and the spacers 30 can be mounted in an exact manner. Since each tooth block 4 is capable of transmitting the entire drive power, the spacing distance of the individual tooth blocks on the periphery of the drum 2 may also be more than two spacings when the looping angle of the drive chain is large enough.

However, to ensure the required distance between the drum 2 and the required diameter for supporting the drive chain even between the tooth blocks 4, segment pieces 18 or 20 or spacers 30 extend between the individual tooth blocks 4.

The segment piece 18 is used when the distance from tooth block 4 to tooth block 4 corresponds to one spacing difference and the diameter of the drum 2 corresponds to a preferred diameter, so that this segment piece 18 can be directly screwed or welded onto the periphery of the drum. The segment piece 18 is not subject to wear and does not serve for force transmission.

If the drum diameter does not correspond to such a preferred diameter, spacers 24 for the segment pieces 20 may also be fitted into appropriate grooves 22 in the same manner as for the tooth blocks 4. The thickness of these spacers 24 is chosen in such a way that the diameter difference is compensated. These spacers 24 can also be welded or screwed onto the periphery of the drum 2, while the segment pieces 20 are screwed onto the spacers 24. The spacers 24 are furnished always in sets, so that the entire circumference of the drum can be equipped with tooth blocks 4 and segment pieces 20 while maintaining the required pitch diameter.

The segment pieces 20 can also be utilized for the transmission of the circumferential forces when one end face is brought into contact with a tooth block 4 in a direction opposite the direction of rotation of the drum 2. In this manner, the load can be removed from the fastening screws 12 of a tooth block 4 or from the spacers 16. The opposite side of the segment piece 20 may have a larger clearance toward the adjacent tooth block 4.

The spacers 30 are similar to the spacers 16,24, however, they have such a height that they serve for supporting the rollers 32 of the drive chain in the manner of the segment pieces 18,20. Since the diameter difference between the drum and the diameter required for an integral number of tooth blocks is at most equal to the spacing divided by $\pi$, the progressive ratio can become very large and can no longer be bridged by means of the simple spacers 16,18. In this case, a spacer 34 has an enlarged base 36 with a beveled base surface. As a result, the spacer 34 can better adjust to the drum curvature, and bending stresses which are too high cannot be created in the tooth block 4.

The chain wheel system according to the invention makes it possible to offer a standardized toothing system. The chain drive is designed by means of tables or curves in accordance with the power to be transmitted, so that the chain wheel system can be constructed without any further computations. As a result of this standardization, a chain wheel system can be designed for any chosen drum diameter.

What is claimed is:

1. Chain wheel system comprising a drum having a circumferential periphery, tooth blocks secured to the circumferential periphery of said drum, a mating chain for engagement with said tooth blocks for driving said drum, said mating chain having spaced means for engaging said tooth blocks and driving said drum, wherein the improvement comprises that said tooth blocks are screwed to the circumferential periphery of said drum, said tooth blocks have a length in the circumferential periphery of said drum corresponding to at least one spacing of said spaced means, each said tooth block has a tooth crest located intermediate the ends thereof in the circumferential direction of said drum, the side of said tooth block facing said drum having a pair of grooves therein parallel to the axis of said drum, spacers fastened to the circumferential periphery of said drum and fitted into said grooves in said tooth block for adjusting the radially outer dimension of said tooth blocks relative to the axis of said drum, said spacers having a height dimension in the radial direction of said drum at least equal to the depth of said grooves into said tooth block, and said spacers are each of equal height and compensate for the difference between the diameter of said drum and the diameter required for a whole number of said tooth blocks.

2. Chain wheel system, as set forth in claim 1, wherein said spacers have an enlarged base in contact with the circumferential periphery of said drum with the side surfaces of said spacers being beveled outwardly from said tooth block toward said drum.

3. Chain wheel system, as set forth in claim 1, wherein spacer members located between adjacent tooth blocks in the circumferential direction of said drum, adjacent spacer members being spaced apart by an amount equal to the spacing of said spaced means, and said spacer members having a height in the radial direction of said drum adjusted to a diameter relative to the drum diameter for providing a whole number of tooth blocks extending in the circumferential peripheral direction of said drum.

4. Chain wheel system, as set forth in claim 1, wherein said spacers are screwed to the circumferential periphery of said drum.

5. Chain wheel system, as set forth in claim 1, wherein said spacers are welded to the circumferential periphery of said drum.

6. Chain wheel system, as set forth in claim 1, wherein each said tooth block has a tooth crest spaced approximately centrally of the ends of said tooth block spaced apart in the circumferential direction of said drum, each said tooth crest having a bore of limited tolerance therein for receiving a gauge to permit adjusting the required cord length between two said tooth blocks.

7. Chain wheel system, as set forth in claim 1, wherein each said tooth block and said segment piece having a center marking spaced equidistantly thereon from the opposite ends thereof spaced apart in the circumferential direction of said drum.

8. Chain wheel system, as set forth in claim 1, wherein at least one segment piece is located between two adjacent tooth blocks in the circumferential direction of said drum and the length of said segment piece in the circumferential direction of said drum corresponding at least to the length of one said tooth block and said segment piece having a height in the radial direction of said drum adjusted to a diameter in relation to the drum diameter which is required for providing a whole number of said tooth blocks around said drum.

9. Chain wheel system, as set forth in claim 8, wherein said segment pieces are welded to the circumferential periphery of said drum.

10. Chain wheel system, as set forth in claim 8, wherein said segment pieces are screwed to the circumferential periphery of said drum.

11. Chain wheel system, as set forth in claim 8, wherein said segment piece has grooves formed in the surface thereof facing the circumferential peripheral surface of said drum, spacers fastened on the circumferential peripheral surface of said drum and fitted into said grooves, said spacers having a height in the radial direction at least equal to the depth of the grooves in said segment piece.

12. Chain wheel system, as set forth in claim 11, wherein said spacers have an equal height and the height of said spacers compensates for the difference in diameter between the diameter of said drum and the diameter required for a whole number of said tooth blocks around the circumferential periphery of said drum.

13. Chain wheel system, as set forth in claim 11, wherein said spacers are screwed to the circumferential periphery of said drum.

14. Chain wheel system, as set forth in claim 11, wherein said spacers are welded to the circumferential periphery of said drum.

* * * * *